US011220978B2

(12) United States Patent
Gardes et al.

(10) Patent No.: US 11,220,978 B2
(45) Date of Patent: Jan. 11, 2022

(54) TURBOFAN COMPRISING A SET OF ROTATABLE BLADES FOR BLOCKING OFF THE BYPASS FLOW DUCT

(71) Applicant: Airbus Operations SAS, Toulouse (FR)

(72) Inventors: Pascal Gardes, Levignac (FR); José Goncalves, Colomiers (FR); Bastian Sabathier, Fonsorbes (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 227 days.

(21) Appl. No.: 16/699,890

(22) Filed: Dec. 2, 2019

(65) Prior Publication Data

US 2020/0191156 A1 Jun. 18, 2020

(30) Foreign Application Priority Data

Dec. 13, 2018 (FR) ...................................... 1872841

(51) Int. Cl.
*F02K 1/72* (2006.01)
*F04D 27/02* (2006.01)
(Continued)

(52) U.S. Cl.
CPC .............. *F02K 1/72* (2013.01); *F01D 17/167* (2013.01); *F02K 1/09* (2013.01); *F02K 1/12* (2013.01);
(Continued)

(58) Field of Classification Search
CPC ..... F02K 1/72; F02K 1/64; F02K 1/42; F02K 1/12; F02K 1/09; F04D 27/0215;
(Continued)

(56) References Cited

U.S. PATENT DOCUMENTS 2,933,890 A 4/1960 Morrison
3,040,524 A * 6/1962 Kurti ......................... F02K 1/76
60/226.2
(Continued)

FOREIGN PATENT DOCUMENTS

FR 2379705 A1 * 9/1978 ............... F02K 1/72
WO 2011124793 A1 10/2011

OTHER PUBLICATIONS

French Search Report; priority document.

*Primary Examiner* — Justin D Seabe
*Assistant Examiner* — Wayne A Lambert
(74) *Attorney, Agent, or Firm* — Greer, Burns & Crain, Ltd.

(57) ABSTRACT

A turbofan having a nacelle comprising a slider mobile in translation between an advanced and a retracted position to open a window between a duct and the exterior, a plurality of blades, each one mobile in rotation on the slider between a stowed and a deployed position, where the blades are split into groups, where each group comprises a first blade, and a maneuvering system moving each blade and comprising a cam integral with the first blade of one of the groups and having a tooth, a groove receiving the tooth, a first transmission system transmitting the movement of the first blade bearing the cam to a first blade of each other group, and, for each group, a second transmission system transmitting the movement of the blade that bears the cam or is moved by the first transmission system to each of the other blades of the group.

6 Claims, 4 Drawing Sheets

(51) Int. Cl.
  *F01D 17/16* (2006.01)
  *F02K 1/42* (2006.01)
  *F02K 1/12* (2006.01)
  *F02K 1/09* (2006.01)
  *F02K 1/64* (2006.01)

(52) U.S. Cl.
  CPC ................ *F02K 1/42* (2013.01); *F02K 1/64* (2013.01); *F04D 27/0215* (2013.01); *F05D 2240/129* (2013.01)

(58) Field of Classification Search
  CPC ......... F05D 2240/129; F05D 2250/312; F05D 2250/411; F05D 2250/35; F05D 2260/56; Y02T 50/60; B64D 29/06
  See application file for complete search history.

(56) References Cited

U.S. PATENT DOCUMENTS

| | | | | |
|---|---|---|---|---|
| 3,503,211 A | * | 3/1970 | Holman | F02K 1/72 60/229 |
| 3,598,318 A | * | 8/1971 | Schiel | F02K 1/64 239/265.13 |
| 4,545,199 A | * | 10/1985 | Sankey | F02K 1/72 239/265.29 |
| 4,807,434 A | * | 2/1989 | Jurich | F02K 1/72 60/226.2 |
| 5,782,432 A | * | 7/1998 | Renshaw | F02K 1/06 244/53 R |
| 7,789,347 B2 | * | 9/2010 | Oberle | E05D 15/1005 244/129.4 |
| 7,891,167 B2 | | 2/2011 | Udall | |
| 8,096,501 B2 | * | 1/2012 | Marche | F02K 1/72 244/11 OB |
| 8,448,420 B2 | * | 5/2013 | Bulin | F02K 1/72 60/226.2 |
| 10,344,709 B2 | * | 7/2019 | Smith | F02K 1/766 |
| 10,830,089 B2 | * | 11/2020 | Gardes | F01D 17/167 |
| 2013/0025260 A1 | | 1/2013 | Pitiot et al. | |
| 2015/0354499 A1 | * | 12/2015 | Caruel | F02K 1/72 239/265.19 |
| 2017/0198658 A1 | * | 7/2017 | Higgins | B64D 33/04 |
| 2020/0240359 A1 | * | 7/2020 | Gardes | F16H 25/18 |
| 2020/0325785 A1 | * | 10/2020 | Gardes | F02K 1/72 |
| 2020/0325848 A1 | * | 10/2020 | Gardes | F02K 1/09 |
| 2020/0362708 A1 | * | 11/2020 | Gardes | F01D 7/00 |
| 2021/0017935 A1 | * | 1/2021 | Cazeaux | F02K 1/72 |

* cited by examiner

TURBOFAN COMPRISING A SET OF ROTATABLE BLADES FOR BLOCKING OFF THE BYPASS FLOW DUCT

CROSS-REFERENCES TO RELATED APPLICATIONS

This application claims the benefit of the French patent application No. 1872841 filed on Dec. 13, 2018, the entire disclosures of which are incorporated herein by way of reference.

FIELD OF THE INVENTION

The present invention relates to a turbofan which comprises a set of blades which are mounted so as to be able to rotate in order to block the duct for the bypass flow, and to an aircraft comprising at least one such turbofan.

BACKGROUND OF THE INVENTION

An aircraft includes a fuselage, to each side of which is fixed a wing. Under each wing is suspended at least one turbofan. Each turbofan is fixed under the wing by means of a pylon that is fixed between the structure of the wing and the structure of the turbofan.

The turbofan comprises a motor and a nacelle that is fixed around the motor. The turbofan has, between the nacelle and the motor, a bypass duct in which a bypass flow flows.

The nacelle comprises a plurality of reversal doors, each one being mobile in rotation on the structure of the nacelle, between a stowed position in which it is not in the bypass duct and a deployed position in which it is positioned across the bypass duct in order to redirect the bypass flow towards a window which is in the wall of the nacelle and which is open between the bypass duct and the outside of the nacelle.

Thus, the bypass flow is redirected to the outside and, more specifically, towards the front of the engine in order to generate reverse thrust.

Although reversal doors are entirely satisfactory, it is desirable to find different mechanisms, in particular more lightweight mechanisms.

SUMMARY OF THE INVENTION

One object of the present invention is to propose a turbofan which comprises a set of blades which are mounted so as to be able to rotate in order to block the duct of the bypass flow.

To that end, a turbofan is proposed having a longitudinal axis and comprising a motor and a nacelle, surrounding the motor, which comprises a fan casing, in which a duct for a bypass flow is delimited between the nacelle and the motor, and in which a flow of air flows in a flow direction, the nacelle comprising:
  a fixed structure fixed to the fan casing,
  a mobile assembly having a mobile cowl and a slider, the mobile cowl being fixed to the slider, the slider being mobile in translation, on the fixed structure, in a direction of translation between an advanced position in which the slider is positioned such that the mobile cowl is moved close to the fan casing and a retracted position in which the slider is positioned such that the mobile cowl is moved away from the fan casing so as to define, between them, an open window between the duct and the exterior of the nacelle,
  a plurality of blades, each one comprising a first end mounted mobile in rotation on the slider about an axis of rotation generally parallel to the longitudinal axis, where each blade is mobile between a stowed position in which the blade is outside the duct and a deployed position in which the blade is across the duct, where the plurality of blades is split into groups, where each group comprises a first blade located furthest downstream, with respect to the direction of flow, compared to the other blades of the same group, where, for each group, the blade of rank 'n' is located upstream of the blade of rank 'n−1' in the direction of flow and is offset angularly about the longitudinal axis X with respect to the blade of rank 'n−1'.
  an assembly of actuators causing the slider to move between the advanced position and the retracted position, and vice versa, and
  a maneuvering system intended to move each blade from the stowed position to the deployed position and vice versa, where the maneuvering system comprises:
  a cam integral with the first blade of one of the groups and having a tooth,
  a groove, integral with the fixed structure, which receives the tooth and where, when the mobile assembly moves, the tooth follows the groove and rotates the first blade,
  a first transmission system which transmits the movement of the first blade bearing the cam to a first blade of each other group, and
  for each group, a second transmission system which transmits the movement of the blade that bears the cam or is moved by the first transmission system to each of the other blades of the group.

An engine of this kind permits a reduction in mass by replacing the reversal doors and their drive mechanisms with more lightweight pivoting blades having a simplified maneuvering system.

Advantageously, the mobile cowl comprises a U-shaped profile coaxial with the longitudinal axis and open towards the longitudinal axis, the blades are mounted mobile in rotation on the U-shaped profile, in the stowed position, each blade is received in the U-shaped profile and, in the deployed position, a second end of each blade leaves the U-shaped profile.

Advantageously, the groove has a proximal end where the tooth is located when the slider is in the advanced position, and the groove has, at its proximal end, a straight portion parallel to the direction of translation.

Advantageously, the first transmission system comprises, for two first blades of two adjacent groups, a connecting rod mounted articulated between the two first blades, and the point of articulation of the connecting rod to each first blade is off-center with respect to the axis of rotation of the first blade.

Advantageously, the second transmission system comprises, for each blade of a group, from the first blade to the penultimate blade, a peg integral with the blade, extending parallel to the longitudinal axis and projecting towards the blade of immediately superior rank, and the second transmission system comprises, for each blade of a group, from the second blade to the last blade, a groove created in the blade and arranged so as to receive the peg of the blade of immediately inferior rank.

The invention also proposes an aircraft comprising at least one turbofan in accordance with one of the above variants.

BRIEF DESCRIPTION OF THE DRAWINGS

The abovementioned features of the invention, along with others, will become more clearly apparent on reading the following description of one exemplary embodiment, the description being given with reference to the appended drawings, in which.

DETAILED DESCRIPTION OF THE PREFERRED EMBODIMENTS

In the following description, the terms relating to a position refer to the direction of flow of the air in an engine which therefore flows from the front to the rear of the aircraft.

Figure 1:
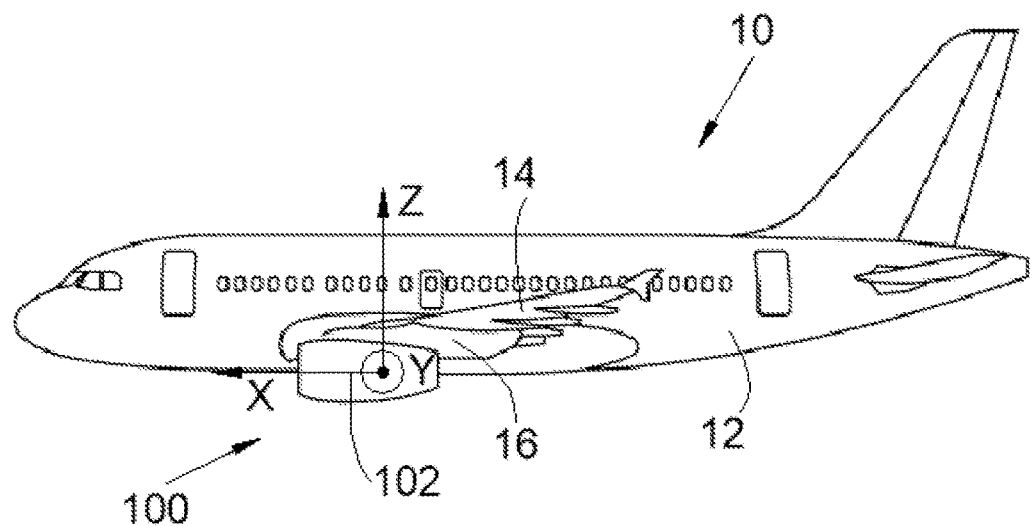
FIG. 1 is a side view of an aircraft comprising a turbofan according to the invention.

FIG. 1 shows an aircraft 10 that comprises a fuselage 12, to each side of which is fixed a wing 14 that bears at least one turbofan 100 according to the invention. The turbofan 100 is fixed under the wing 14 by means of a pylon 16.

Figure 2:
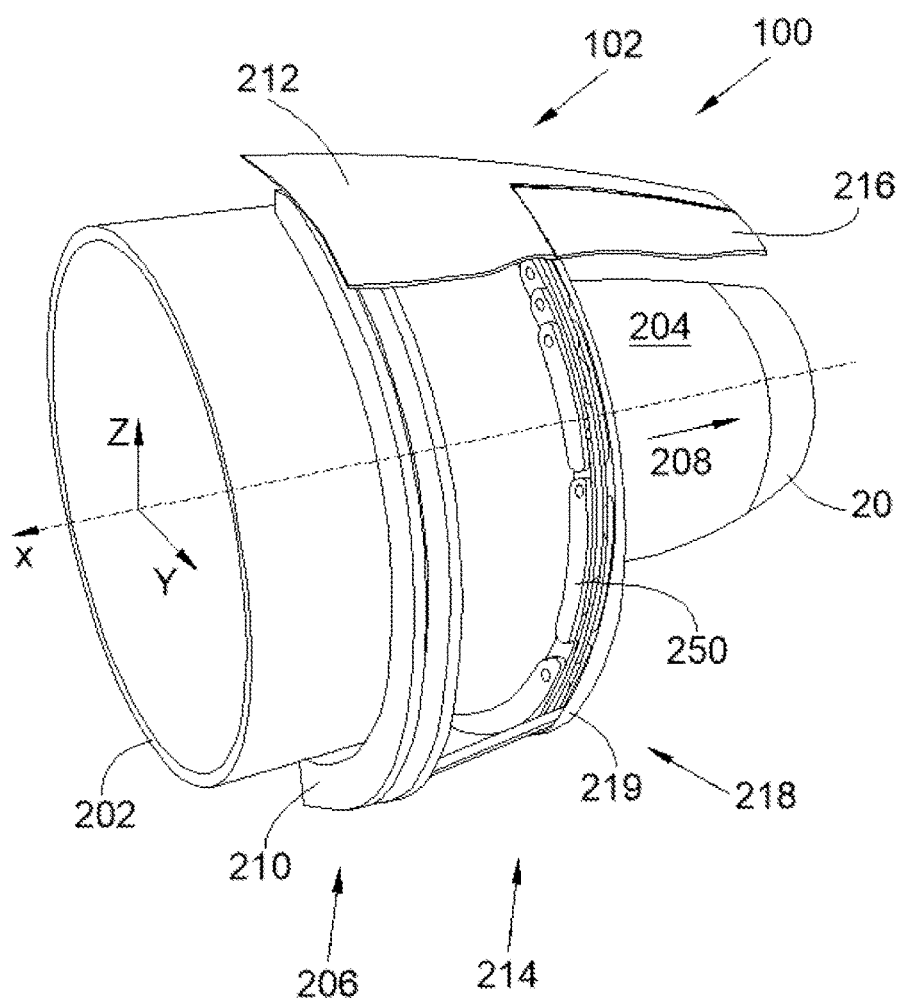
FIG. 2 is a perspective view of the turbofan according to the invention in the advanced and stowed position.
Figure 3:
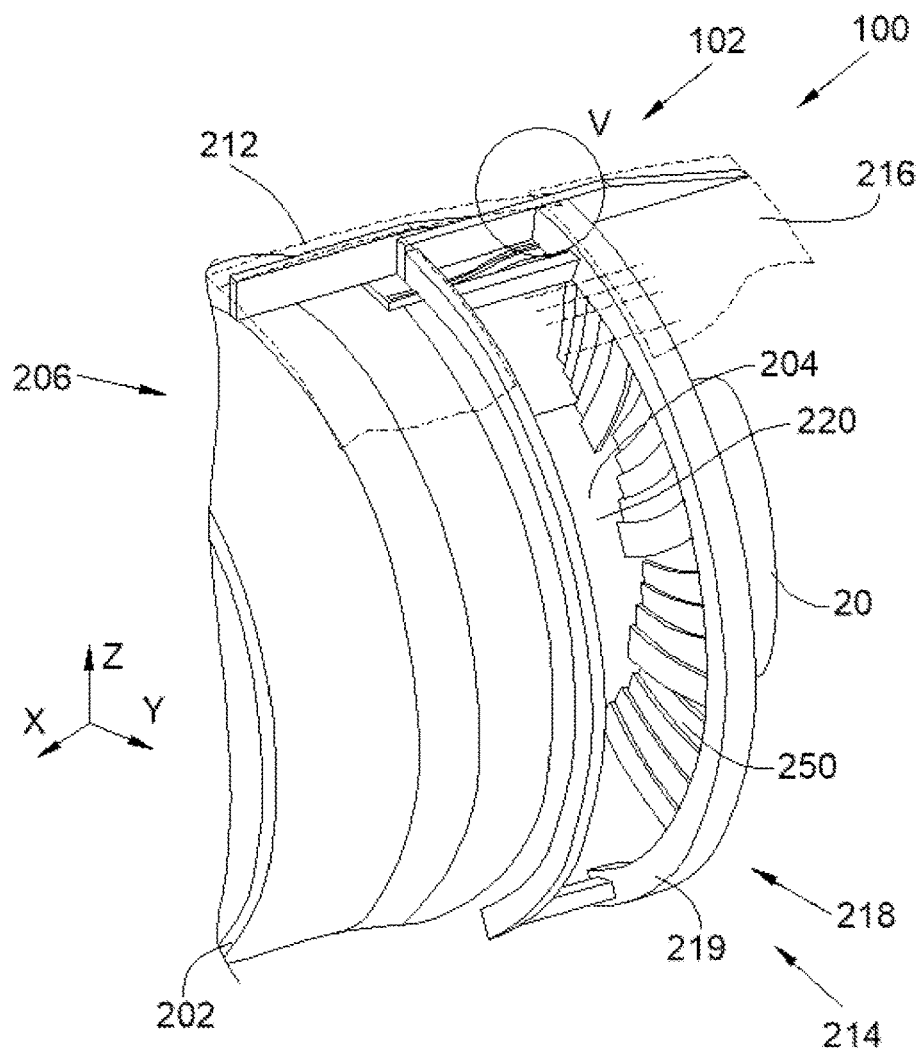
FIG. 3 is a perspective view of the turbofan according to the invention in the retracted and deployed position.

FIG. 2 and FIG. 3 show the turbofan 100 which has a nacelle 102 and a motor 20 which is housed inside the nacelle 102 and comprises a fan casing 202. The motor 20 is represented by its rear exhaust part.

In the following description, and by convention, X denotes the longitudinal axis of the turbofan 100 that is parallel to the longitudinal axis of the aircraft 10 oriented positively towards the front of the aircraft 10, Y denotes the transverse axis which is horizontal when the aircraft is on the ground, and Z denotes the vertical axis, these three directions X, Y and Z being mutually orthogonal.

Figure 4:
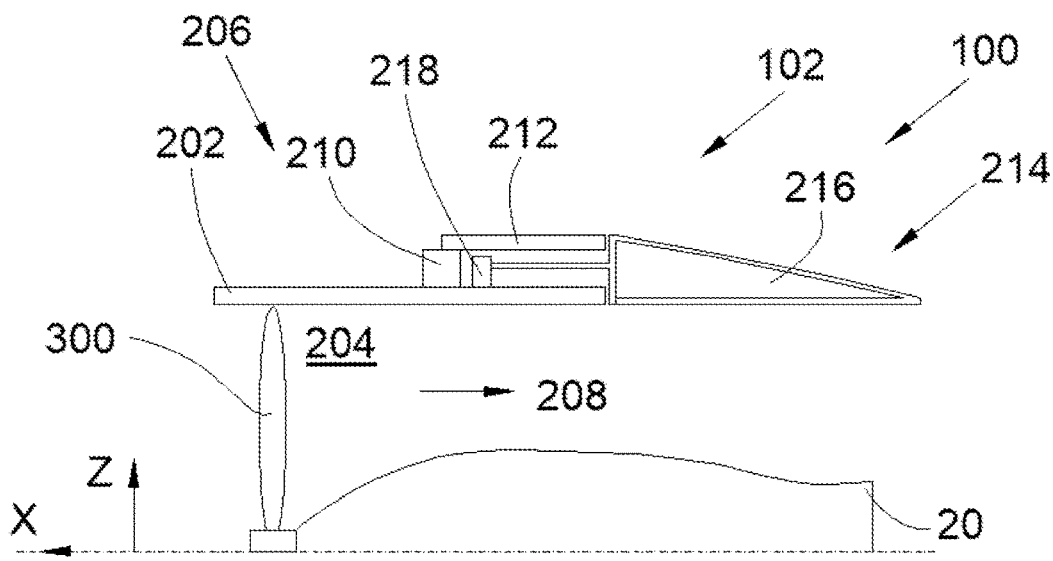
FIG. 4 is a schematic representation of a turbofan according to the invention, viewed in vertical section.

FIG. 2 and FIG. 3 show the turbofan 100 in two different use positions, and FIG. 4 shows a schematic representation in section of the turbofan 100.

The turbofan 100 has, between the nacelle 102 and the motor 20, a duct 204 in which flows a bypass flow 208 coming from the air intake through a fan 300, and which therefore flows in the flow direction from forward to rear.

The nacelle 102 has a fixed structure 206 that is mounted fixed on the fan casing 202. Here in particular, the fixed structure 206 comprises a front frame 210 mounted around the fan casing 202 and outer panels 212 forming an aerodynamic surface which are shown as transparent in FIG. 3, and of which a portion is cut away in FIGS. 2 and 3.

The nacelle 102 has a mobile assembly 214 which has a mobile cowl 216 (also transparent in FIG. 3) of which a portion is cut away in FIGS. 2 and 3 and which forms the outer walls of the nozzle.

The nacelle 102 also has a slider 218. In this case, the slider 218 is in the form of a cylinder having openwork walls. The mobile cowl 216 is fixed to and downstream of the slider 218 with respect to the direction of flow of the flow of air in the turbofan 100.

The slider 218 is mounted mobile in translation in a translation direction globally parallel to the longitudinal axis X on the fixed structure 206 of the nacelle 102.

The slider 218 is mobile between an advanced position (FIG. 2) and a retracted position (FIG. 3) and vice versa. In the advanced position, the slider 218 is positioned as far forward as possible, with respect to the flow direction, such that the mobile cowl 216 is moved close to the outer panels 212 and to the fan casing 202 and thus forms an aerodynamic surface. In the retracted position, the slider 218 is positioned as far aft as possible, with respect to the flow direction, such that the mobile cowl 216 is moved away from the outer panels 212 and from the fan casing 202 so as to define, between them, a window 220.

In the advanced position, the mobile cowl 216 and the outer panels 212 extend one another so as to define the outer surface of the nacelle 102, and the mobile cowl 216 and the fan casing 202 extend one another so as to define the outer surface of the duct 204.

In the retracted position, the mobile cowl 216 and the fan casing 202, and the outer panels 212, are spaced apart from one another and define, between them, the open window 220 between the duct 204 and the exterior of the nacelle 102. That is to say that the air from the bypass flow 208 passes through the window 220 to end up outside the turbofan 100.

The slider 218 is made to translate by any appropriate means, such as slideways between the fixed structure 206 and the slider 218.

The nacelle 102 also comprises a set of actuators (not shown) that move the slider 218 in translation between the advanced position and the retracted position and vice versa. Each actuator is controlled by a control unit, for example of the processor type, which controls the movements in one direction or the other according to the requirements of the aircraft 10.

Each actuator may, for example, take the form of a double-action jack (two working directions), of which the cylinder is fixed to the fixed structure 206 and a rod is fixed to the slider 218.

In order to orient the flow of air leaving the window 220, cascades can be fixed to the slider 218 facing the window 220.

The fan casing 202 and the outer panels 212 form the upstream boundary of the window 220 with respect to the direction of flow and the mobile cowl 216 forms the downstream boundary of the window 220 with respect to the direction of flow.

The nacelle 102 comprises a plurality of blades 250, each being mounted so as to be able to rotate on the slider 218 about an axis of rotation that is generally parallel to the longitudinal axis X. Thus, each blade 250 is able to move between a stowed position (FIG. 2) in which the blade 250 is outside the duct 204 and a deployed position (FIG. 3) in which the blade 250 is across the duct 204 in order to redirect the bypass flow 208 towards the window 220.

Each blade 250 extends in a plane perpendicular to the longitudinal axis X.

Each blade 250 is mounted so as to be able to move on the perimeter of the slider 218. When the blades 250 are in the stowed position, they are superposed in the direction of the longitudinal axis X, in groups, one on top of the other so as to align in a circular shape as shown in FIG. 2.

In the embodiment of the invention, each blade 250 is in the shape of a bean, but different shapes are conceivable.

The number of blades 250, and the shape of each of these, depend on the dimensions of the turbofan 100 and on the width of each blade 250 in order that, in the deployed position, the blades 250 block the majority of the duct 204.

Each blade 250 is mounted so as to be able to move at a first end while a second end moves closer to the motor 20 when the blade 250 is deployed so as to best block the duct 204.

Passage from the stowed position to the deployed position is brought about by rotation of the blade 250 towards the interior of the engine 100.

The stowed position can be adopted when the slider 218 is in the advanced position or the retracted position. The deployed position can be adopted only when the slider 218 is in the retracted position.

The slider 218 also has a maneuvering system 400 which moves each blade 250 from the stowed position to the deployed position and vice versa, and which is described hereinbelow.

Thus, operation comprises, starting from the advanced/stowed position, in ordering activation of the actuators to move the slider 218 from the advanced position to the retracted position; during this movement, the maneuvering system 400 moves the blades 250 from the stowed position to the deployed position.

Conversely, operation thus comprises, starting from the retracted/deployed position, in ordering activation of the actuators to move the slider 218 from the retracted position to the advanced position; during this movement, the maneuvering system 400 moves the blades 250 from the deployed position to the stowed position.

The use of the blades 250 mounted so as to be able to rotate on the slider 218 makes it possible to lighten the assembly compared to the use of reversal doors of the prior art.

Figure 6:
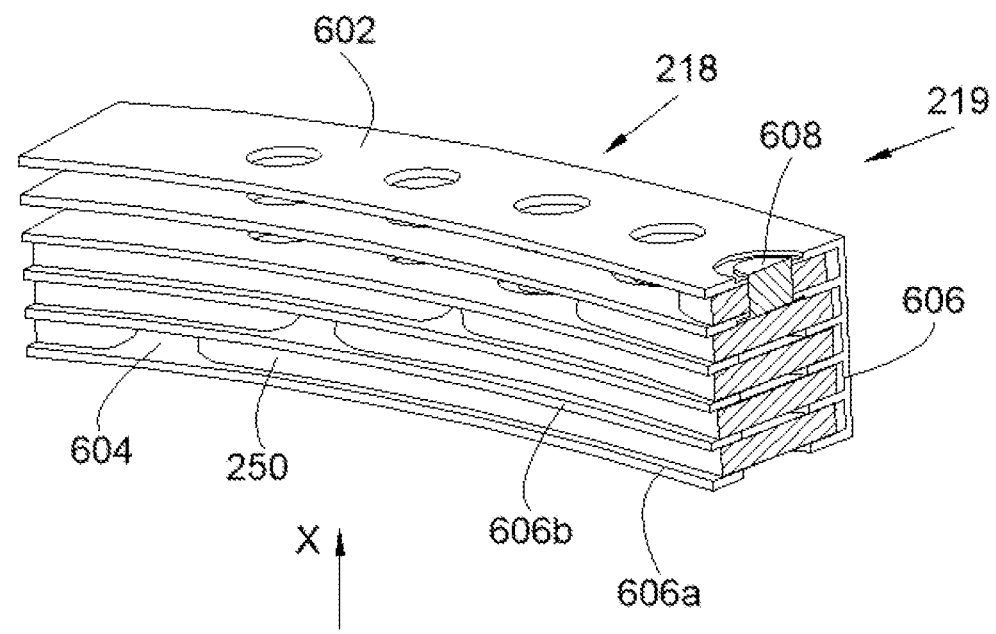
FIG. 6 is a perspective view of the blade pivot system.

FIG. 6 shows a particular embodiment of the pivot connections between the blades 250 and the slider 218.

As shown in FIG. 2, the plurality of blades 250 is split into groups and in each group the blades 250 are superposed in the direction of the longitudinal axis X and each group covers a small angular opening.

Each group comprises a first blade 250 which is located further downstream, with respect to the direction of flow, than the other blades 250 of the same group.

In each group, the blade 250 of rank 'n' is located upstream of the blade 250 of rank 'n-1' in the direction of flow and is offset angularly about the longitudinal axis X with respect to the blade 250 of rank 'n-1' in order to offset the axes of rotation of the blades 250 with respect to one another, along the perimeter of the slider 218. Here, 'n' is greater than or equal to 2.

Preferably, the blades 250 of the same order are positioned on one and the same stage and in one and the same XZ radial plane perpendicular to the longitudinal axis X.

The number of groups, the number of blades 250 per group and the angular offset may vary, and make it possible to cover the entire duct 204.

The slider 218 comprises a U-shaped profile 219 which is partially withdrawn in FIG. 2 in order to be able to visualize the blades 250. The U-shaped profile 219 is coaxial with the longitudinal axis X and open towards the longitudinal axis X. The U-shaped profile 219 forms a cage 602 of which only one sector is shown in FIG. 6. The blades 250 are mounted so as to be able to rotate on the U-shaped profile 219.

The cage 602 has an outer wall 606 forming the bottom of the U, which takes the form of a cylinder or a portion of the cylinder over the angular extent that is to be covered, and which constitutes the outward-oriented wall of the nacelle 102. The outer wall 606 is concentric with the longitudinal axis X.

For each stage of blades 250, the cage 602 has a slot 604 which is arranged between an upstream wall 606b and a downstream wall 606a and which is open towards the interior of the nacelle 102.

Each upstream wall 606b and each downstream wall 606a are in a plane perpendicular to the longitudinal axis X and form a ring or a portion of a ring that is concentric with the longitudinal axis X. The upstream and downstream end walls form the walls of the U.

When they are in the stowed position, the blades 250 of one and the same stage are received in the slot 604 associated with the stage.

The pivot connection, about which each blade 250 is mounted so as to be able to pivot, may take various forms.

According to one particular embodiment, for each blade 250 a shaft 608 integral with the blade 250 is mounted so as to be able to rotate at the first end, between the upstream wall 606b and the downstream wall 606a of the stage corresponding to the blade 250 and forms the axis of rotation of the blade 250.

According to another embodiment, for each blade 250 a shaft 608 is mounted fixed between the upstream wall 606b and the downstream wall 606a of the stage corresponding to the blade 250, and the blade 250 is mounted so as to be able to rotate about the shaft 608 by means of a close fit at the first end. The shaft 608 forms the axis of rotation of the blade 250.

Figure 5:
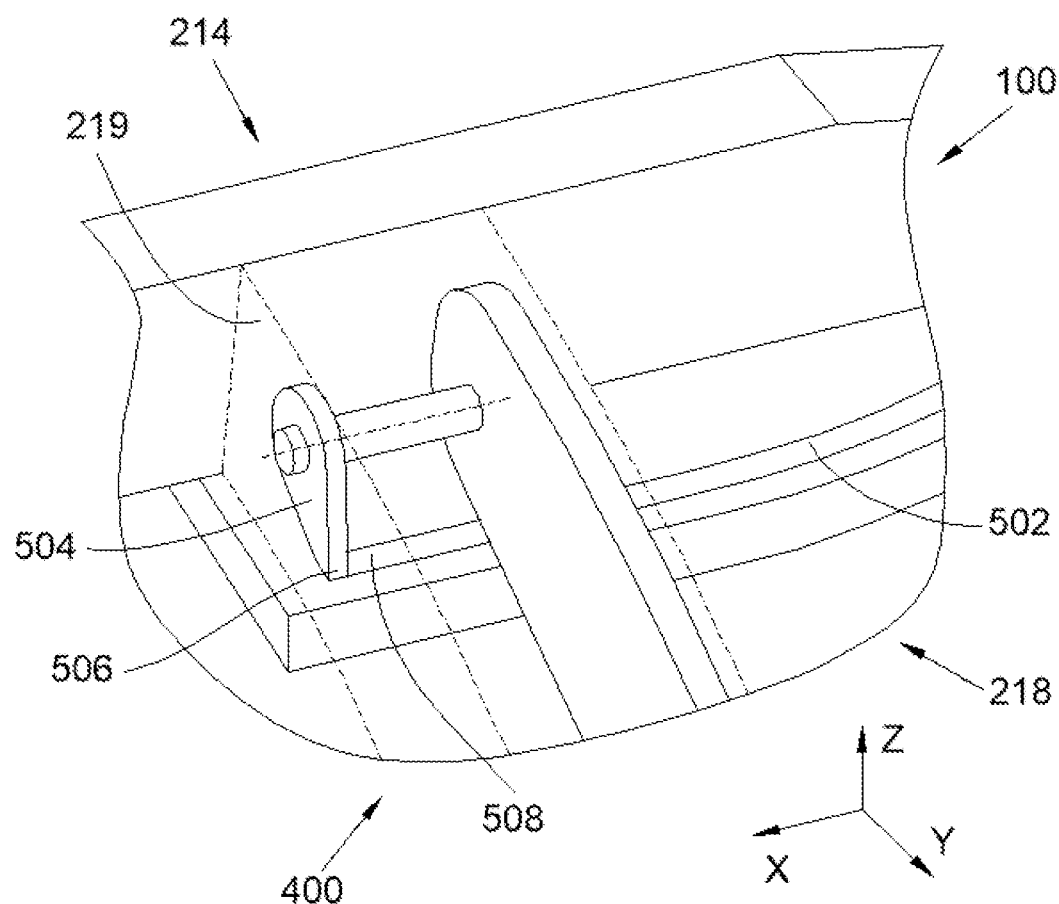
FIG. 5 is a perspective view of detail V of FIG. 3.
Figure 7:
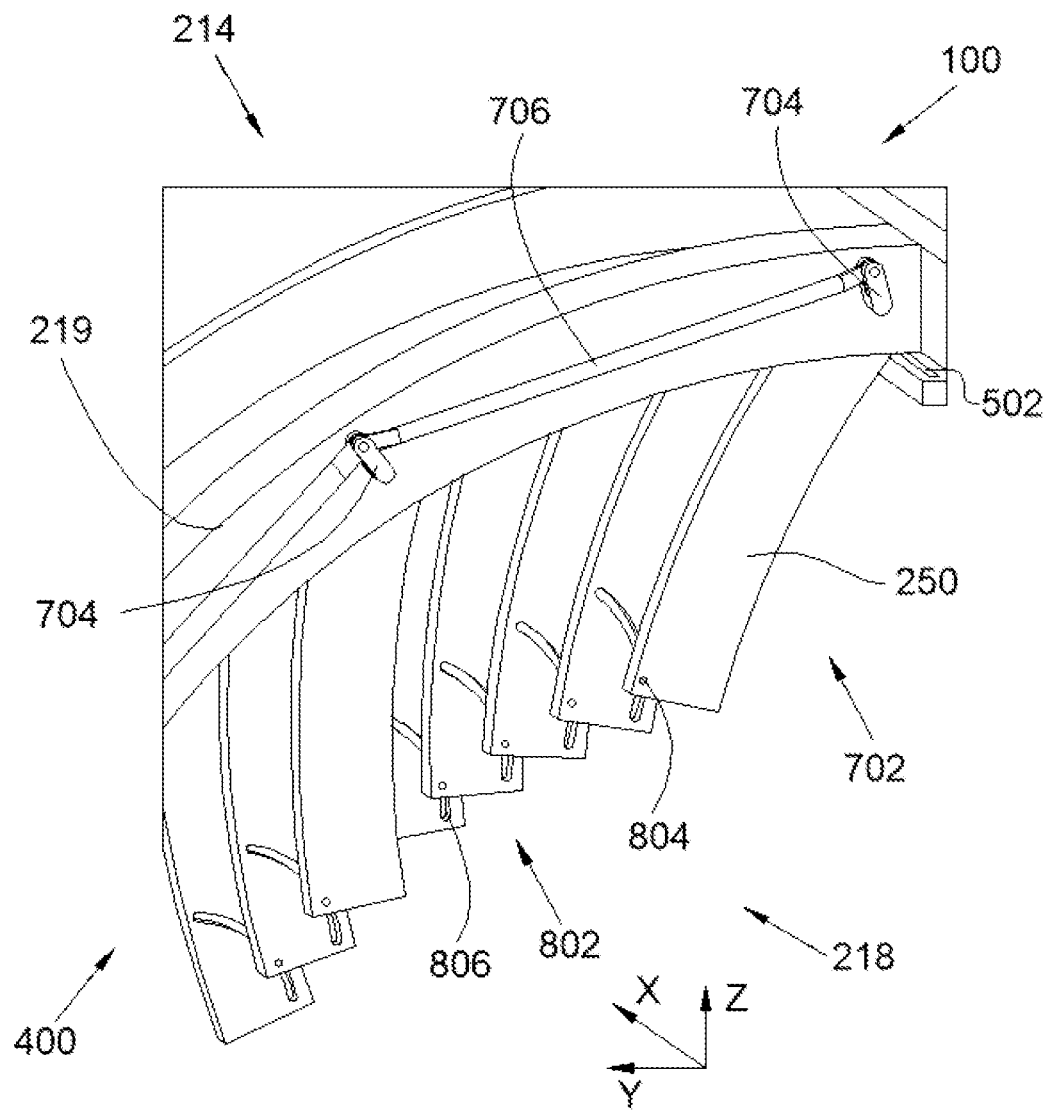
FIG. 7 is a perspective view from behind of a transmission system according to the invention.

FIGS. 5 and 7 show the maneuvering system 400.

FIG. 5 shows an enlargement of the detail V where the U-shaped profile 219 is shown as transparent and FIG. 7 shows a view from behind of the same detail V.

In the stowed position, each blade 250 is received in the U-shaped profile 219, and in the deployed position the second end leaves the U-shaped profile 219 to move closer to the motor 20.

The fixed structure 206 comprises a groove 502 which, in this example, is arranged at 12 o'clock.

One of the blades 250 of a group, in this case the first blade 250 starting from the top of the nacelle 102, is equipped with a cam 504 that has a tooth 506 which is received in the groove 502. In the embodiment of the invention shown here, the cam 504 is at a distance from the blade 250, but it could be integrated into the blade 250.

As the mobile assembly 214 moves towards the retracted position, the tooth 506 follows the groove 502 and a deviation of the groove 502 causes a rotation of the cam 504 and therefore of the blade 250, about its axis of rotation, towards its deployed position, and vice versa.

The groove 502 has a shape which is suitable to allow the rotation of the blade 250 from the stowed position to the deployed position when the slider 218 passes from the advanced position to the retracted position. Conversely, the groove 502 has a shape which is suitable to allow the rotation of the blade 250 from the deployed position to the stowed position when the slider 218 passes from the retracted position to the advanced position.

The groove 502 has a proximal end where the tooth 506 is positioned when the slider 218 is in the advanced position, and a distal end where the tooth 506 is positioned when the slider 218 is in the retracted position.

To avoid the blade 250 deploying right from the beginning of the translation of the slider 218 towards its retracted position, the groove 502 has, at its proximal end, a straight portion 508 parallel to the direction of translation.

Thus, the maneuvering system 400 comprises the groove 502, the cam 504, a first transmission system 702 and, for each group, a second transmission system 802.

The first transmission system 702 transmits the movement of the first blade 250 bearing the cam 504 to a first blade 250 of each other group, which then moves simultaneously.

In each group, the second transmission system 802 transmits the movement of the blade 250 that bears the cam 504 or is moved by the first transmission system 702 to each of the other blades 250 of the same group.

Thus, the movement of a single blade 250, that bearing the cam 504, will drive the movement of all of the blades 250.

Thus, moving all of the blades 250 is relatively simple to implement and does not require actuators beyond those necessary for moving the slider 218.

The first transmission system 702 comprises, for two first blades 250 of two neighboring groups, a connecting rod 706 mounted articulated between the two first blades 250. The point of articulation of the connecting rod 706 to each first blade 250 is off-center with respect to the axis of rotation of the first blade 250. Thus, when one of the first blades 250 moves, the other first blade 250 is driven in rotation by the connecting rod 706.

In the embodiment of the invention shown here, the connecting rods 706 are outside the U-shaped profile 219 and are fixed to the first blades 250 by means of first cams 704, where each first cam 704 is integral with a first blade 250 through a bore in the U-shaped profile 219 provided for that purpose. Here, each first blade 250 is fixed to the first blade 250 at its axis of rotation and the articulation of the connecting rod 706 is offset with respect to this axis of rotation.

The second transmission system 802 comprises, for each blade 250 of a group, from the first blade 250 to the penultimate blade 250, a peg 804 integral with the blade 250, extending parallel to the longitudinal axis X and projecting towards the blade 250 of immediately superior rank, that is to say, forwards.

The second transmission system 802 comprises, for each blade 250 of a group, from the second blade 250 to the last blade 250, a groove 806 created in the blade 250 and arranged so as to receive the peg 804 of the blade 250 of immediately inferior rank. Thus, the groove 806 is open towards the rear.

Thus, the peg 804 of the first blade 250 is received in the groove 806 of the second blade 250, whose peg 804 is received in the groove 806 of the third blade 250, and so on.

The shape of the groove 806 is designed to allow the associated blade 250 to move as the corresponding peg 804 moves. Thus, for each group, the movement of the first blade 250 drives the movement of the other blades 250 of the group.

The invention has been more particularly described in the case of a nacelle under a wing but can be applied to a nacelle located at the rear of the fuselage.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A turbofan having a longitudinal axis and comprising a motor and a nacelle, surrounding the motor, which comprises a fan casing, in which a duct for a bypass flow is delimited between the nacelle and the motor and in which a flow of air flows in a flow direction, said nacelle comprising:
    a fixed structure fixed to the fan casing,
    a mobile assembly having a mobile cowl and a slider, the mobile cowl being fixed to the slider, the slider being mobile in translation, on the fixed structure, in a direction of translation between an advanced position in which the slider is positioned such that the mobile cowl is moved close to the fan casing and a retracted position in which the slider is positioned such that the mobile cowl is moved away from the fan casing so as to define, between them, an open window between the duct and an exterior of the nacelle,
    a plurality of blades, each one comprising a first end mounted mobile in rotation on the slider about an axis of rotation generally parallel to the longitudinal axis, where each blade is mobile between a stowed position in which the blade is outside the duct and a deployed position in which the blade is across the duct, where said plurality of blades is split into groups, where each group comprises a first blade located furthest downstream, with respect to a direction of flow, compared to other blades of the same group, where, for each group, a blade of rank 'n' is located upstream of a blade of rank 'n–1' in the direction of flow and is offset angularly about the longitudinal axis with respect to the blade of rank 'n–1',
    an assembly of actuators causing the slider to move between the advanced position and the retracted position, and vice versa, and
    a maneuvering system configured to move each blade from the stowed position to the deployed position and vice versa, where the maneuvering system comprises:
        a cam integral with the first blade of one of the groups and having a tooth,
        a groove, integral with the fixed structure, which receives the tooth and where, when the mobile assembly moves, the tooth follows the groove and rotates said first blade,
        a first transmission system which transmits a movement of the first blade bearing the cam to a first blade of each other group, and
        for each group, a second transmission system which transmits the movement of the blade that bears the cam or is moved by the first transmission system to each of the other blades of said group.

2. The turbofan according to claim 1, wherein the mobile cowl comprises a U-shaped profile coaxial with the longitudinal axis and open towards the longitudinal axis, wherein the blades are mounted mobile in rotation on the U-shaped profile, wherein, in the stowed position, each blade is received in the U-shaped profile and wherein, in the deployed position, a second end of each blade leaves the U-shaped profile.

3. The turbofan according to claim 1, wherein the groove has a proximal end where the tooth is located when the slider is in the advanced position, and wherein the groove has, at its proximal end, a straight portion parallel to the direction of translation.

4. The turbofan according to claim 1, wherein the first transmission system comprises, for two first blades of two adjacent groups, a connecting rod mounted articulated between said two first blades, and wherein a point of articulation of the connecting rod to each first blade is off-center with respect to the axis of rotation of the first blade.

5. The turbofan according to claim 1,
wherein the second transmission system comprises, for each blade of a group, from the first blade to a penultimate blade, a peg integral with said blade, extending parallel to the longitudinal axis and projecting towards a blade of immediately superior rank, and
wherein the second transmission system comprises, for each blade of a group, from a second blade to a last blade, a groove created in said blade and arranged so as to receive a peg of a blade of immediately inferior rank.

6. An aircraft comprising at least one turbofan according to claim 1.

* * * * *